(12) United States Patent
Benoit et al.

(10) Patent No.: US 8,430,365 B2
(45) Date of Patent: Apr. 30, 2013

(54) TUBE HOLDING BLOCK ASSEMBLY

(75) Inventors: Thomas A. Benoit, Bourbonnais, IL (US); Christopher M. Pangallo, Chicago, IL (US); Brian Peek, Mokena, IL (US)

(73) Assignee: Illinois Tool Works Inc., Glenview, IL (US)

( * ) Notice: Subject to any disclaimer, the term of this patent is extended or adjusted under 35 U.S.C. 154(b) by 300 days.

(21) Appl. No.: 12/412,468

(22) Filed: Mar. 27, 2009

(65) Prior Publication Data
US 2009/0250559 A1    Oct. 8, 2009

Related U.S. Application Data

(60) Provisional application No. 61/041,981, filed on Apr. 3, 2008.

(51) Int. Cl.
| | |
|---|---|
| F16L 3/00 | (2006.01) |
| F16L 3/10 | (2006.01) |
| F16L 3/22 | (2006.01) |
| F16L 3/08 | (2006.01) |
| F16L 39/00 | (2006.01) |
| F16L 41/00 | (2006.01) |

(52) U.S. Cl.
USPC .......... 248/49; 348/68.1; 348/74.1; 348/74.5; 348/67.5; 348/65; 285/124.2; 285/124.3; 285/124.4; 285/124.5; 285/209

(58) Field of Classification Search ............ 248/65, 248/67.5, 68.1, 74.1, 74.5, 49; 285/124.1, 285/124.2, 124.3, 124.4, 124.5, 207, 208, 285/209

See application file for complete search history.

(56) References Cited

U.S. PATENT DOCUMENTS

| | | | | |
|---|---|---|---|---|
| 2,889,602 | A | * | 6/1959 | Maniaci ................. 248/68.1 |
| 3,929,356 | A | * | 12/1975 | DeVincent et al. ............ 285/305 |
| 4,118,838 | A | * | 10/1978 | Schiefer et al. ............. 24/115 R |
| 4,431,152 | A | * | 2/1984 | Reed, Jr. ......................... 248/65 |
| 4,591,192 | A | * | 5/1986 | Van Exel et al. ................. 285/83 |
| 4,707,262 | A | * | 11/1987 | Murken ......................... 210/448 |
| 4,753,268 | A | * | 6/1988 | Palau ............................ 137/595 |
| 4,959,509 | A | * | 9/1990 | Takeuchi et al. ............... 277/606 |
| 5,219,185 | A | * | 6/1993 | Oddenino ....................... 285/26 |
| 5,230,496 | A | * | 7/1993 | Shillington et al. ........ 248/316.5 |
| 5,271,646 | A | * | 12/1993 | Allread et al. ............. 285/124.2 |
| 5,332,268 | A | * | 7/1994 | Godeau et al. .................. 285/26 |
| 5,354,101 | A | * | 10/1994 | Anderson, Jr. .................. 285/25 |
| 5,507,529 | A | * | 4/1996 | Martins ........................... 285/26 |
| 5,526,876 | A | * | 6/1996 | Karube ......................... 165/176 |
| 5,593,187 | A | * | 1/1997 | Okuda et al. .................. 285/305 |
| 5,683,117 | A | * | 11/1997 | Corbett et al. .................. 285/24 |
| 5,692,783 | A | * | 12/1997 | Watanabe et al. ............... 285/61 |

(Continued)

FOREIGN PATENT DOCUMENTS

EP        571286 A1 * 11/1993

*Primary Examiner* — Teri P. Lu
*Assistant Examiner* — Chiedu Chibogu
(74) *Attorney, Agent, or Firm* — Mark W. Croll; Paul F. Donovan (57) ABSTRACT

A tube retention block assembly having a support body incorporating one or more tube support passageways of discontinuous character extending across the support body. A displaceable retaining yoke member is adapted for insertion into a slot disposed transverse to the tube support passageways. The retaining yoke member includes one or more engagement cradles adapted to at least partially surround and lock in place tubes extending through the tube support body.

20 Claims, 5 Drawing Sheets

U.S. PATENT DOCUMENTS

| | | | | |
|---|---|---|---|---|
| 5,699,834 A * | 12/1997 | Hayashi et al. | | 137/884 |
| 5,725,255 A * | 3/1998 | Hayashi et al. | | 285/26 |
| 5,836,212 A * | 11/1998 | Bates | | 74/502.6 |
| 5,860,677 A * | 1/1999 | Martins et al. | | 285/26 |
| 5,860,681 A * | 1/1999 | Slais | | 285/137.11 |
| 5,884,372 A * | 3/1999 | Anscher et al. | | 24/339 |
| 5,944,056 A * | 8/1999 | Miyazoe et al. | | 137/625.64 |
| 5,964,483 A * | 10/1999 | Long et al. | | 285/305 |
| 6,070,659 A * | 6/2000 | Hosoya | | 165/178 |
| 6,095,462 A * | 8/2000 | Morgan | | 248/82 |
| 6,119,305 A * | 9/2000 | Loveall et al. | | 16/2.2 |
| 6,220,343 B1 * | 4/2001 | Ichiyanagi | | 165/153 |
| 6,382,678 B1 * | 5/2002 | Field et al. | | 285/3 |
| 6,386,596 B1 * | 5/2002 | Olson | | 285/321 |
| 6,425,416 B1 * | 7/2002 | Narita et al. | | 137/625.27 |
| 6,540,531 B2 * | 4/2003 | Syed et al. | | 439/98 |
| 6,688,331 B2 * | 2/2004 | Demersseman et al. | | 137/571 |
| 6,834,891 B2 * | 12/2004 | Matsubara et al. | | 285/319 |
| 6,866,300 B2 * | 3/2005 | Hayes et al. | | 285/124.2 |
| 6,908,119 B2 * | 6/2005 | Murken | | 285/305 |
| 7,464,966 B2 * | 12/2008 | Miyajima et al. | | 285/124.3 |
| 7,766,391 B2 * | 8/2010 | Kim et al. | | 285/205 |
| 2002/0117850 A1 * | 8/2002 | Wood et al. | | 285/124.1 |
| 2003/0193187 A1 * | 10/2003 | Takada et al. | | 285/120.1 |
| 2005/0029806 A1 * | 2/2005 | Yamanashi et al. | | 285/124.1 |
| 2007/0029796 A1 * | 2/2007 | Bibby | | 285/308 |

\* cited by examiner

TUBE HOLDING BLOCK ASSEMBLY

CROSS-REFERENCE TO RELATED APPLICATION

This Application claims the benefit of U.S. Provisional Application Ser. No. 61/041,981 filed Apr. 3, 2008, the contents of which are hereby incorporated by reference as if fully set forth herein.

FIELD OF THE INVENTION

The present invention relates generally to holding blocks adapted to hold tube elements. More particularly, the invention relates to holding blocks adapted to support air conditioning or other lines at a transition across a firewall or other dividing wall structure within a vehicle.

BACKGROUND OF THE INVENTION

In various environments of use, tubes carrying gaseous or liquid fluid media are routed across a dividing wall structure. By way of example only, in a transportation vehicle such as an automobile, aircraft or the like, air conditioning lines are routed from the engine compartment and across a structural firewall to access the passenger compartment ventilation system. According to prior known practices, these lines typically have been supported by holding blocks located at the firewall. Exemplary prior holding blocks have been in the form of metal blocks having two holes to accommodate tubes passing therethrough and a third opening to accommodate a screw or other fastener. The fastener secures the block to the firewall. The block, in turn, secures the tubes in place as they transition between the engine compartment and the passenger compartment. The tubes are held in place within the block by soldering the metal tubes to the metal block.

While the practice of using a metal support block with soldered connections is believed to provide a secure transition, the use of soldering to hold the tubes in place may require a substantial level of skill and effort. In addition, the use of metal holding blocks may give rise to a relatively high expense as well as to increased weight. Accordingly, an improved holding assembly which is not reliant upon such block and solder connections would be desirable.

SUMMARY OF THE INVENTION

The present invention provides advantages and alternatives relative to the prior art by providing a tube retention block assembly having a support body incorporating one or more tube support passageways of discontinuous character extending across the support body. A displaceable retaining yoke member is adapted for insertion into a slot disposed transverse to the tube support passageways. The retaining yoke member includes one or more engagement cradles adapted to at least partially surround and lock in place tubes extending through the tube support body.

In accordance with one aspect, the present invention provides a tube retention assembly adapted to secure at least a first tube member in a predefined axial position. The tube retention assembly includes a support body including at least a first tube support passageway of discontinuous character adapted to receive and retain the first tube member. The first tube support passageway includes a raised shoulder surface at an interior portion of the first tube support passageway. The raised shoulder surface defines a reduced diameter opening within the first tube support passageway adapted to pass a distal length segment of the first tube member. The distal length segment includes a distal enhanced diameter tube surface. The raised shoulder surface is adapted to block a proximal enhanced diameter tube surface disposed at a position along the first tube member in spaced relation from the distal enhanced diameter tube surface. The support body includes a slot opening disposed in transverse, intersecting relation to the first tube support passageway. A displaceable retaining yoke is adapted for insertion into the slot opening. The retaining yoke includes at least one tube engagement cradle adapted to at least partially surround a neck portion of the first tube member at a position between the proximal enhanced diameter tube surface and the distal enhanced diameter tube surface. The tube engagement cradle is adapted to block passage of the distal enhanced diameter tube surface.

In accordance with another aspect, the present invention provides a tube retention assembly including at least a first tube member including a distal length segment having a distal enhanced diameter tube surface. The first tube member further includes a proximal enhanced diameter tube surface disposed at a position along the first tube member in spaced relation from the distal enhanced diameter tube surface to define a neck portion between the distal enhanced diameter tube surface and the proximal enhanced diameter tube surface. A support body is adapted to support the first tube member at a predefined axial position within the support body. The support body includes at least a first tube support passageway of discontinuous character adapted to receive and retain the first tube member. The first tube support passageway includes a raised shoulder surface at an interior portion. The raised shoulder surface defines a reduced diameter opening adapted to pass the distal enhanced diameter tube surface, the raised shoulder surface is adapted to block passage of the proximal enhanced diameter tube surface. The body portion includes a slot opening disposed in transverse relation to the first tube support passageway. A displaceable retaining yoke is adapted for insertion into the slot opening. The retaining yoke includes at least one tube engagement cradle adapted to at least partially surround the neck portion of the first tube member. The tube engagement cradle is adapted to block passage of the distal enhanced diameter tube surface.

In accordance with another aspect, the present invention provides a tube retention assembly including a first tube member including a first distal length segment having a first distal enhanced diameter tube surface. The first tube member further including a first proximal enhanced diameter tube surface disposed at a position along the first tube member in spaced relation from the first distal enhanced diameter tube surface to define a first neck portion between the first distal enhanced diameter tube surface and the first proximal enhanced diameter tube surface. At least a second tube member including a second distal length segment having a second distal enhanced diameter tube surface. The second tube member further including a second proximal enhanced diameter tube surface disposed at a position along the second tube member in spaced relation from the second distal enhanced diameter tube surface to define a second neck portion between the second distal enhanced diameter tube surface and the second proximal enhanced diameter tube surface. A support body adapted to support the first tube member at a first predefined axial position within the support body and the second tube member at a second predefined axial position within the support body. The support body includes a first tube support passageway of discontinuous character adapted to receive and retain the first tube member and at least a second tube support passageway of discontinuous character adapted to receive and retain the second tube member. The first tube support passageway includes a first raised shoulder surface at an interior portion of the first tube support passageway. The first raised shoulder surface defines a first reduced diameter opening within the first tube support passageway adapted to pass the first distal enhanced diameter tube surface. The first raised shoulder surface is adapted to block passage of the first proximal enhanced diameter tube surface. The second tube support passageway includes a second raised shoulder surface at an interior portion of the second tube support passageway. The second raised shoulder surface defines a second reduced diameter opening within the second tube support passageway adapted to pass the second distal enhanced diameter tube surface. The second raised shoulder surface is adapted to block passage of the second proximal enhanced diameter tube surface. The body portion includes a slot opening disposed in transverse intersecting relation to the first tube support passageway and the second tube support passageway. A displaceable retaining yoke is adapted for insertion into the slot opening. The retaining yoke includes a first tube engagement cradle adapted to at least partially surround the first neck portion of the first tube member. The first tube engagement cradle is adapted to block passage of the first distal enhanced diameter tube surface. The retaining yoke further includes at least a second tube engagement cradle adapted to at least partially surround the second neck portion of the second tube member. The second tube engagement cradle is adapted to block passage of the second distal enhanced diameter tube surface.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF THE PREFERRED EMBODIMENTS

Reference will now be made to the drawings, wherein to the extent possible, like elements are designated by like reference numerals throughout the various views.

Figure 1:
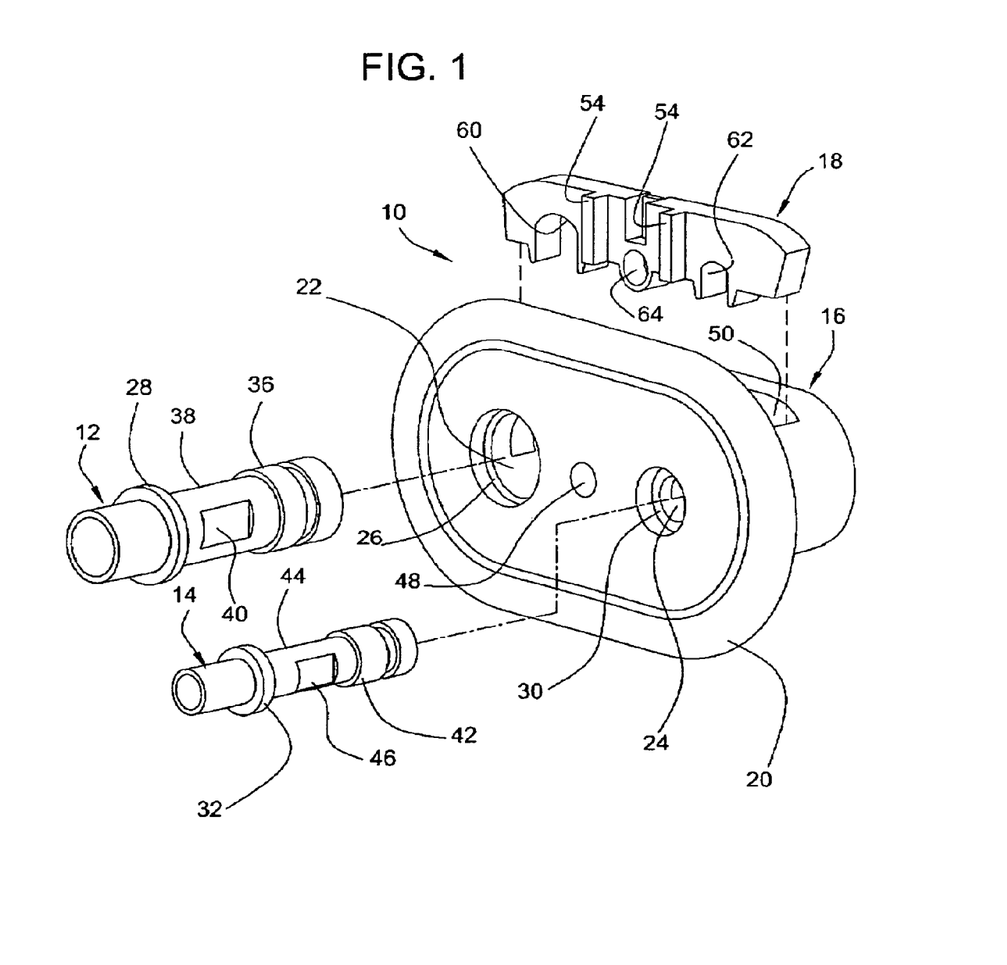
FIG. 1 is an exploded view illustrating an exemplary embodiment of a tube retention block assembly consistent with the present invention illustrating tube elements positioned for insertion into tube support passageways within a tube support body.

FIG. 1 illustrates an exemplary tube retention assembly 10 adapted to support and retain a first tube member 12 and a second tube member 14. In the illustrated and exemplary construction, the tube retention assembly 10 includes a tube support body 16 and a retaining yoke 18. The tube support body 16 includes a flexible sealing member 20 of rubber or other flexible material disposed about the perimeter of a face. The sealing member 20 assists in forming a sealing relationship with a firewall (not shown) or other structure in which the tube retention assembly 10 may be mounted.

As illustrated, the tube support body 16 includes a first tube support passageway 22 adapted to receive the first tube member 12. The tube support body 16 also includes a second tube support passageway 24 adapted to receive the second tube member 14. In the exemplary construction, the first tube support passageway 22 includes a first raised annular shoulder surface 26 at the interior. In operation, the first raised annular shoulder surface 26 defines a reduced diameter opening within the first tube support passageway. This reduced diameter opening is sized to permit passage of a distal length segment of the first tube member 12 but to block passage of a first flange structure 28 defining a proximal enhanced diameter tube surface 29 disposed at least partially about a proximal portion of the first tube member 12. Thus, the first raised annular shoulder surface 26 defines a stop which limits the insertion of the first tube member 12 by abutment against the first flange structure 28. Likewise, the second tube support passageway 24 includes a second raised annular shoulder surface 30 which limits the extent of insertion of the second tube member 14 by engaging a second flange structure 32 defining a proximal enhanced diameter tube surface 33 disposed at least partially about a proximal portion of the second tube member 14. Accordingly, by setting the positions of the first raised annular shoulder surface 26 and the second raised annular shoulder surface 30 along with the positions of the first flange structure 28 and the second flange structure 32, a well-defined degree of insertion by the first and second tube members may be achieved. As will be appreciated, while the first and second raised annular shoulder surfaces 26, 30 and the first and second flange structures 28, 32 are illustrated as substantially continuous annular structures, it is likewise contemplated that other continuous or discontinuous configurations providing raised profiled surfaces may likewise be used if desired.

Figure 3:
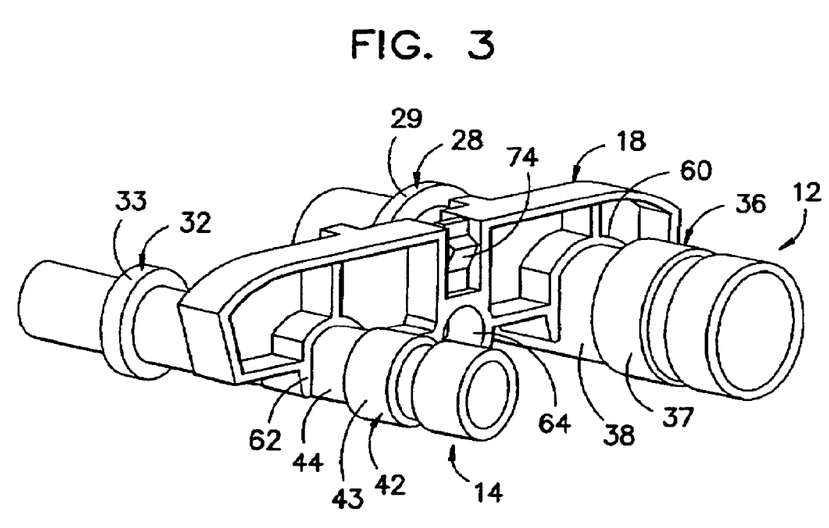
FIG. 3 is an elevation perspective view illustrating an exemplary engagement between the retaining yoke and tube elements at the interior of a tube support body.

As best illustrated in FIG. 1 and FIG. 3, the first tube member 12 may include a first enhanced diameter annular ring 36 defining a first distal enhanced diameter tube surface 37 disposed in axially spaced relation from the first flange structure 28. A first reduced diameter neck 38 is located between the first flange structure 28 and the first enhanced diameter annular ring 36. if desired, one or more flats 40 may be disposed along the length of the first reduced diameter neck 38. In this regard, while only a single flat 40 is illustrated, a corresponding flat may be disposed along an opposing surface or at other locations about the perimeter. In practice, the orientation of flats 40 may be used to control and maintain the relative rotational orientation of the first tube member 12 within the tube support body 16 in a manner as will be described further hereinafter. Likewise, the second tube member 14 may include a second enhanced diameter annular ring 42 defining a second distal enhanced diameter tube surface 43 disposed in axially spaced relation from the second flange structure 32. A second reduced diameter neck 44 located between the second flange structure 32 and the second enhanced diameter annular ring 42. One or more flats 46 may be formed along the length of the second reduced diameter neck 44 to aid in rotational positioning of the second tube member 14 as will be described further hereinafter.

Figure 2:
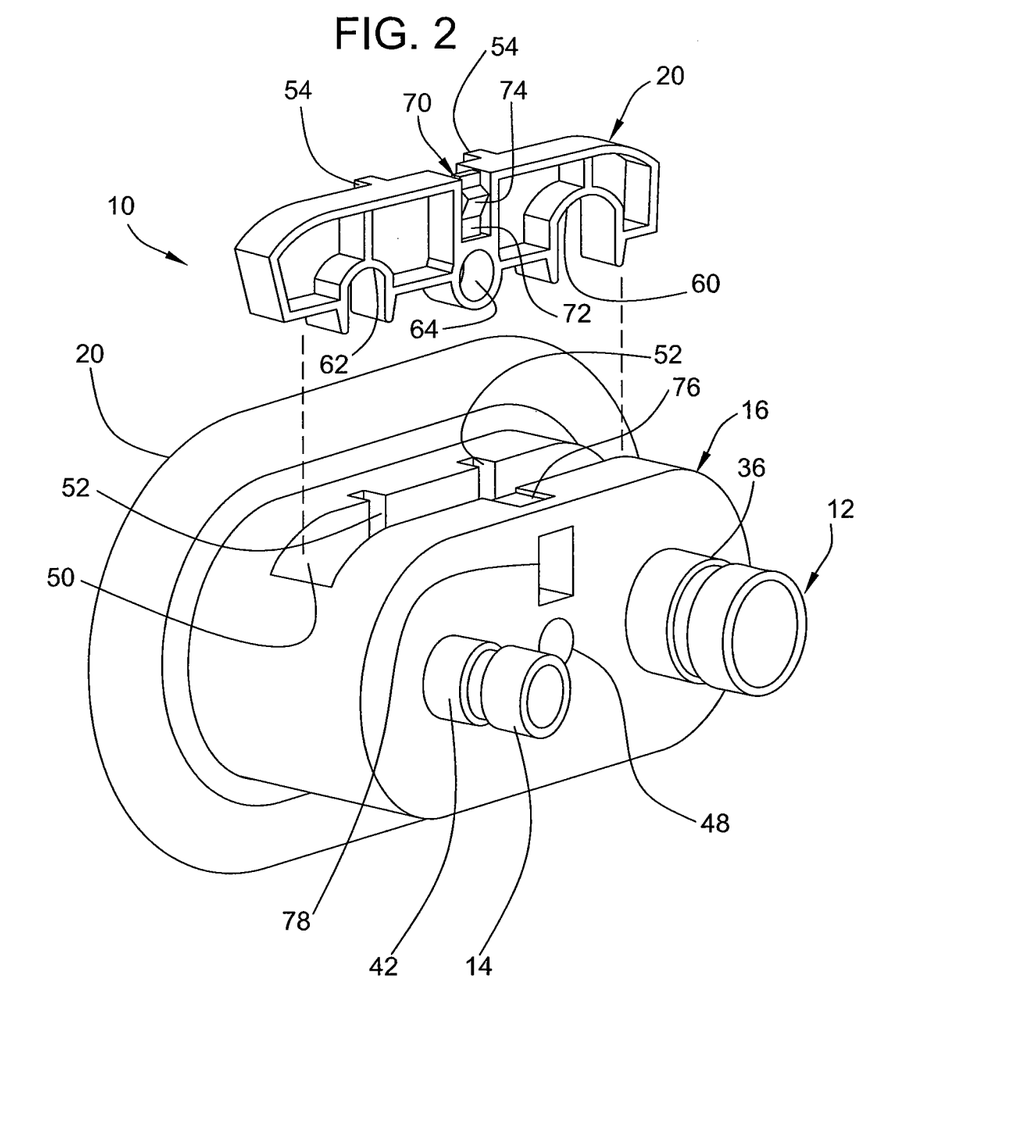
FIG. 2 is a partial assembly view illustrating the tube retention block assembly of FIG. 1 with tube elements in inserted relation and with the retaining yoke disengaged.

As illustrated though joint reference to FIGS. 1 and 2, the exemplary tube support body 16 includes a fastener acceptance passageway 48 which extends axially through the tube support body 16 in generally parallel relation to the first and second tube support passageways. The fastener acceptance passageway 48 is adapted to receive a bolt or other attachment device (not shown) as may be desired for connection of the tube retention assembly 10 to the fire wall (not shown) or other support structure as may be desired. Of course, it is to be understood that while a single fastener acceptance passageway 48 has been illustrated, additional attachment passageways may be utilized if desired. Likewise, while the illustrated construction uses only a first tube support passageway 22 and a second tube support passageway 24 to support a first tube member 12 and a second tube member 14 respectively, a greater or lesser or number of tube-support passageways and tube members may be utilized if desired.

Referring to FIGS. 1 and 2, in the exemplary construction the tube support body 16 includes a slot opening 50 oriented in generally transverse relation to the first tube support passageway 22 and to the second tube support passageway 24. The slot opening 50 extends to a depth to intersect with the first and second tube support passageways such that the tube support passageways are discontinuous along their length. As shown, the slot opening 50 is adapted to accept the retaining yoke 18 in a wedge-fitting relation.

In the illustrated construction, the slot opening 50 includes an arrangement of positioning grooves 52 (FIG. 2) extending along a face of the slot opening 50. As illustrated, the positioning grooves 52 extend generally in a direction corresponding to the path of insertion for the retaining yoke 18. As best illustrated in FIG. 1, the retaining yoke 18 includes an arrangement of positioning ribs 54 that are adapted to engage and ride within the positioning grooves 52 during insertion of the retaining yoke 18. Thus, the engagement between the positioning grooves 52 and the positioning ribs 54 is used to achieve a desired orientation of the retaining yoke 18.

As illustrated through joint reference to FIGS. 1-3, the retaining yoke 18 includes a first tube engagement cradle 60 and a second tube engagement cradle 62. As best illustrated in FIG. 3, the first tube engagement cradle 60 is adapted to fit about the first reduced diameter neck 38 of the first tube member 12. Likewise, the second tube engagement cradle 62 is adapted to fit about the second reduced diameter neck 44 of the second tube member 14. In the illustrated exemplary construction, the first tube engagement cradle 60 is of a generally "U" shaped configuration including downwardly extending opposing legs having generally planar interior surfaces adapted to engage the flats 40 along the first reduced diameter neck 38. Likewise, the second tube engagement cradle 62 is of a generally "U" shaped configuration including downwardly extending opposing legs having generally planar interior surfaces adapted to engage the flats 46 on opposing sides of the second reduced diameter neck 44. Thus, in this arrangement, the first tube member 12 and the second tube member 14 are oriented at a defined angular position and are blocked from rotational movement by the legs of the first and second tube engagement cradles 60, 62 respectively. Of course, it is contemplated that the first tube engagement cradle 60 and/or the second tube engagement cradle 62 may have virtually any other configuration adapted to at least partially surround a corresponding reduced diameter portion of the tube members. By way of example only, and not limitation, the first tube engagement cradle 60 and/or the second tube engagement cradle 62 may have a generally semi-circular or other curved surface configuration which permits rotation of the corresponding tube members.

Regardless of the configuration of the tube engagement cradles 60, 62 they fit about the corresponding reduced diameter necks of the first tube member 12 and the second tube member 14 in a generally nested relation. In this regard, the effective internal diameter of the tube engagement cradles 60, 62 is less than the outer diameter of the corresponding enhanced diameter annular rings 36, 42. Accordingly, with the retaining yoke 18 in place as shown in FIG. 3, the first tube engagement cradle 60 blocks withdrawal of the first tube member 12 and the second tube engagement cradle 62 blocks withdrawal of the second tube member 14. Thus, the first tube member 12 and the second tube member 14 are held at a defined axial position within the tube support body 16.

As shown, in the exemplary construction the retaining yoke 18 also includes an eyelet 64 which is adapted for alignment with the fastener acceptance passageway 48 upon full insertion of the retaining yoke 18 into the slot opening 50. Thus, a fastener such as an elongated bolt, screw or the like, may pass through the eyelet 64 in aligned relation with the fastener acceptance passageway 48.

In the illustrated construction, the retaining yoke 18 includes a snap-in latch 70 which holds the retaining yoke 18 in place within the tube support body 16 following full insertion. In particular, in the illustrated arrangement, the snap-in latch 70 includes a resilient post 72 having an outwardly projecting chamfered detent 74. During insertion of the retaining yoke 18, the chamfered detent 74 rides within a camming groove 76 extending along a wall of the slot opening in generally opposing relation to the positioning grooves 52. Upon full insertion, the chamfered detent 74 snaps in place beneath a ledge formed at the interior of the camming groove 76. In this position, the retaining yoke 18 is blocked against withdrawal. In the event that withdrawal of the retaining yoke 18 is desired, a tool such as a screwdriver or the like may be inserted into an access window 78 to push the resilient post 72 and the chamfered detent 74 inwardly towards the positioning grooves 52 thereby allowing the retaining yoke 18 to be pulled out of position.

As will be appreciated, when the retaining yoke 18 is in inserted retaining position, the first tube member 12 and the second tube member 14 are held in a defined axial position relative to the tube support body 16. This facilitates secure attachment of feed lines to either end of the tube members. Such connections may be made by so-called "quick connect" or other connection techniques as may be known to those of skill in the art.

It is contemplated that the tube support body 16 and/or the retaining yoke 18 may be formed from metal, plastic, or other material as may be desired. In this regard, molded plastic components may be particularly desirable for many environments of use.

Figure 4:
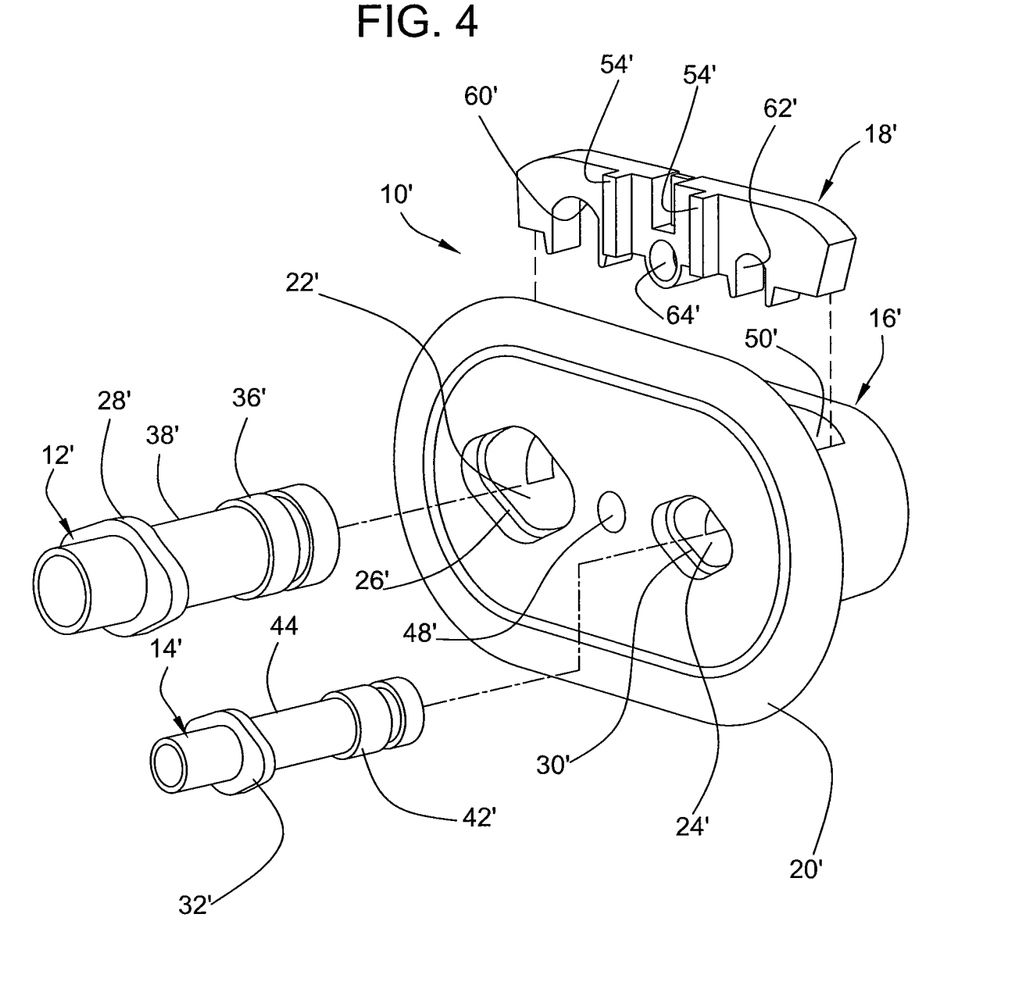
FIG. 4 is a view similar to FIG. 1 illustrating another exemplary embodiment of a tube retention block assembly consistent with the present invention.

Of course, any number of other arrangements may be utilized to provide secure support for tube members within a support body. By way of example only, and not limitation, FIG. 4 illustrates an alternative construction wherein elements corresponding to those previously described are designated by like reference numerals with a prime. In the configuration shown in FIG. 4 the first flange structure 28' and the second flange structure 32' are of non-circular irregular contoured shape. In this arrangement the first flange structure 28' and the second flange structure 32' may pass at least partially through face openings of substantially complementary size and shape in the tube support body 16 during insertion into the first tube support passageway 22' and the second tube support passageway 24' respectively. In the inserted position, the first flange structure 28' and the second flange structure 32' abut against the first raised annular shoulder surface 26' and the second raised annular shoulder surface 28'. Due to the non-circular configuration of the first flange structure 28' and the second flange structure 32', the first tube member 12' and the second tube member 14' are blocked against rotation by engagement between the flange structures 28', 32' and the surrounding walls of the tube support passageways forward of the corresponding annular shoulder surfaces. As will be appreciated, such an arrangement eliminates the need to provide flats along the length of the tube members. Of course, any number of other non-rotatable configurations may be used for the first flange structure 28' and/or the second flange structure 32' including ovals, polygons or the like. Likewise combinations of different anti-rotation arrangements may be used for different tube members if desired.

Figure 5:
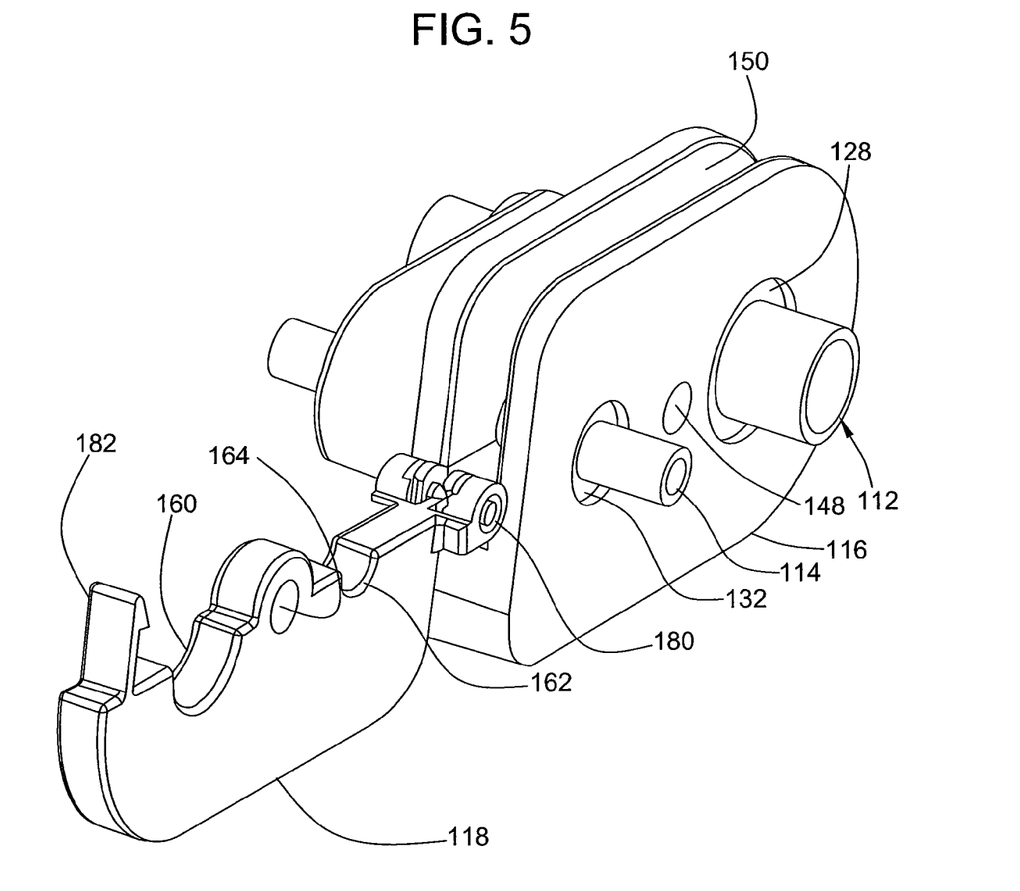
FIG. 5 is a view illustrating another exemplary embodiment of a tube retention block assembly consistent with the present invention illustrating tube elements in inserted position.

FIG. 5 illustrates another exemplary construction wherein elements corresponding to those previously described are designated by like reference numerals within a 100 series. In the arrangement shown in FIG. 5, the retaining yoke 118 is held in hinging relation to the tube support body 116 which supports the tube members 112 and 114 in the manner as previously described. In this arrangement, the retaining yoke 118 includes a first tube engagement cradle 160 and a second tube engagement cradle 162 which fit about reduced diameter neck portions (not shown) of the first tube member 112 and the second tube member 114 respectively when the retaining yoke 118 is rotated into the slot opening 150. By way of example only, and not limitation, the retaining yoke 118 may rotate about a hinge assembly 180 having a construction as shown and described in U.S. Pat. No. 6,053,458 (incorporated herein by reference). Upon rotating into position, the retaining yoke 118 may thereafter be held in place by a hook latch 182 or the like, as may be desired.

Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention the claims are to be construed to include alternative embodiments and equivalents to the extent permitted by the prior art.

Various features of the invention are set forth in the following claims.

What is claimed is:

1. A tube retention assembly adapted to secure at least a first tube member in a predefined axial position, the tube retention assembly comprising:

a support body including at least a first tube support passageway, the first tube support passageway being discontinuous along its length and adapted to receive and retain the first tube member, the first tube support passageway including a raised shoulder surface at an interior portion of the first tube support passageway, the raised shoulder surface defining a reduced diameter opening within the first tube support passageway adapted to pass a distal enhanced diameter tube surface of the first tube member, the raised shoulder surface adapted to block a proximal enhanced diameter tube surface disposed at a position along the first tube member in spaced relation from the distal enhanced diameter tube surface, the support body including a slot opening disposed in transverse intersecting relation to the first tube support passageway;

a displaceable retaining yoke adapted for insertion into the slot opening while the first tube member is disposed within the first tube support passageway, the retaining yoke defining an insertable wedge including at least one tube engagement cradle comprising a concave indenture disposed along an edge of the retaining yoke projecting towards the interior of the support body upon insertion, the cradle having a fixed effective diameter which is less than the distal enhanced diameter tube surface, the cradle being adapted to at least partially surround a neck portion of the first tube member at a position between the proximal enhanced diameter tube surface and the distal enhanced diameter tube surface, the tube engagement cradle adapted to block passage of the distal enhanced diameter tube surface; and a reversible latch adapted to lock the retaining yoke within the support body, the latch being disengageable by single point manipulation of the latch.

2. The tube retention assembly as recited in claim 1, further comprising a deformable seal member disposed at least partially about a face of the support body.

3. The tube retention assembly as recited in claim 1, wherein the support body further includes a fastener acceptance passageway which is discontinuous along its length.

4. The tube retention assembly as recited in claim 3, wherein the retaining yoke further includes an eyelet adapted for alignment with the fastener acceptance passageway.

5. The tube retention assembly as recited in claim 1, wherein the tube engagement cradle is of substantially U-shaped configuration including a pair of opposing legs defining substantially straight tube engagement surfaces.

6. The tube retention assembly as recited in claim 5, wherein the neck portion of the first tube member includes at least one flat zone engaging at least one of the legs.

7. The tube retention assembly as recited in claim 1, wherein the neck portion of the first tube member is substantially round and wherein the proximal enhanced diameter tube surface comprises a non-circular flange adapted to block rotation of the first tube member within the first tube support passageway.

8. A tube retention assembly comprising:

at least a first tube member including a distal enhanced diameter tube surface, the first tube member further including a proximal enhanced diameter tube surface disposed at a position along the first tube member in spaced relation from the distal enhanced diameter tube surface to define a neck portion between the distal enhanced diameter tube surface and the proximal enhanced diameter tube surface;

a support body adapted to support the first tube member at a predefined axial position within the support body, the support body including at least a first tube support passageway, the first tube support passageway being discontinuous along its length and adapted to receive and retain the first tube member, the first tube support passageway including a raised shoulder surface at an interior portion of the first tube support passageway, the raised shoulder surface defining a reduced diameter opening within the first tube support passageway adapted to pass the distal enhanced diameter tube surface, the raised shoulder surface adapted to block passage of the proximal enhanced diameter tube surface, the body portion including a slot opening disposed in transverse intersecting relation to the first tube support passageway;

a displaceable retaining yoke adapted for insertion into the slot opening while the first tube member is disposed within the first tube support passageway, the retaining yoke defining an insertable wedge including at least one tube engagement cradle comprising a concave indenture disposed along an edge of the retaining yoke projecting towards the interior of the support body upon insertion, the cradle having a fixed effective diameter which is less than the distal enhanced diameter tube surface, the cradle being adapted to at least partially surround the neck portion of the first tube member, the tube engagement cradle adapted to block passage of the distal enhanced diameter tube surface; and a reversible latch adapted to lock the retaining yoke within the support body, the latch being disengageable by single point manipulation of the latch.

9. The tube retention assembly as recited in claim 8, further comprising a deformable seal member disposed at least partially about a face of the support body.

10. The tube retention assembly as recited in claim 8, wherein the support body further includes a fastener acceptance passageway which is discontinuous along its length.

11. The tube retention assembly as recited in claim 10, wherein the retaining yoke further includes an eyelet adapted for alignment with the fastener acceptance passageway.

12. The tube retention assembly as recited in claim 8, wherein the tube engagement cradle is of substantially U-shaped configuration including a pair of opposing legs defining substantially straight tube engagement surfaces.

13. The tube retention assembly as recited in claim 12, wherein the neck portion of the first tube member includes at least one flat zone engaging at least one of the legs.

14. The tube retention assembly as recited in claim 8, wherein the neck portion of the first tube member is substantially round and wherein the proximal enhanced diameter tube surface comprises a non-circular flange adapted to block rotation of the first tube member within the first tube support passageway.

15. A tube retention assembly comprising:

a first tube member including a first distal enhanced diameter tube surface, the first tube member further including a first proximal enhanced diameter tube surface disposed at a position along the first tube member in spaced relation from the first distal enhanced diameter tube surface to define a first neck portion between the first distal enhanced diameter tube surface and the first proximal enhanced diameter tube surface;

at least a second tube member including a second distal enhanced diameter tube surface, the second tube member further including a second proximal enhanced diameter tube surface disposed at a position along the second tube member in spaced relation from the second distal enhanced diameter tube surface to define a second neck portion between the second distal enhanced diameter tube surface and the second proximal enhanced diameter tube surface;

a support body adapted to support the first tube member at a first predefined axial position within the support body and the second tube member at a second predefined axial position within the support body, the support body including a first tube support passageway, the first tube support passageway being discontinuous along its length and adapted to receive and retain the first tube member, the support body further including at least a second tube support passageway, the second tube support passageway being discontinuous along its length and adapted to receive and retain the second tube member, the first tube support passageway including a first raised shoulder surface at an interior portion of the first tube support passageway, the first raised shoulder surface defining a first reduced diameter opening within the first tube support passageway adapted to pass the first distal enhanced diameter tube surface, the first raised shoulder surface adapted to block passage of the first proximal enhanced diameter tube surface, the second tube support passageway including a second raised shoulder surface at an interior portion of the second tube support passageway, the second raised shoulder surface defining a second reduced diameter opening within the second tube support passageway adapted to pass the second distal enhanced diameter tube surface, the second raised shoulder surface adapted to block passage of the second proximal enhanced diameter tube surface, the body portion including a slot opening disposed in transverse intersecting relation to the first tube support passageway and the second tube support passageway;

a displaceable retaining yoke defining an insertable wedge adapted for insertion into the slot opening while the first tube member is disposed within the first tube support passageway, the retaining yoke including a first tube engagement cradle comprising a concave indenture disposed along an edge of the retaining yoke projecting towards the interior of the support body upon insertion, the first tube engagement cradle having a fixed effective diameter which is less than the first distal enhanced diameter tube surface, and being adapted to at least partially surround the first neck portion of the first tube member, the first tube engagement cradle adapted to block passage of the first distal enhanced diameter tube surface, the retaining yoke further including at least a second tube engagement cradle comprising a concave indenture disposed along an edge of the retaining yoke projecting towards the interior of the support body upon insertion, the second tube engagement cradle having a fixed effective diameter which is less than the second distal enhanced diameter tube surface, and being adapted to at least partially surround the second neck portion of the second tube member, the second tube engagement cradle adapted to block passage of the second distal enhanced diameter tube surface; and a reversible latch adapted to lock the retaining yoke within the support body, the latch being disengageable by single point manipulation of the latch.

16. The tube retention assembly as recited in claim 15, further comprising a deformable seal member disposed at least partially about a face of the support body.

17. The tube retention assembly as recited in claim 15, wherein the support body further includes a fastener acceptance passageway which is discontinuous along its length.

18. The tube retention assembly as recited in claim 17, wherein the retaining yoke further includes an eyelet adapted for alignment with the fastener acceptance passageway.

19. The tube retention assembly as recited in claim 15, wherein at least one of the first tube engagement cradle and the second tube engagement cradle is of substantially U-shaped configuration including a pair of opposing legs defining substantially straight tube engagement surfaces and wherein at least one of the first neck portion and the second neck portion includes at least one flat zone adapted to engage legs of the corresponding tube engagement cradle.

20. The tube retention assembly as recited in claim 15, wherein at least one of the first neck portion and the second neck portion is substantially round and wherein a corresponding one of the first proximal enhanced diameter tube surface and the second proximal enhanced diameter tube surface comprises a non-circular flange adapted to block rotation within the corresponding tube support passageway.

* * * * *